United States Patent [19]

Braun et al.

[11] Patent Number: 4,627,732
[45] Date of Patent: Dec. 9, 1986

[54] MODE DISCRIMINATION APPARATUS

[75] Inventors: Kenneth H. Braun, North Billerica; Michael S. Perlmutter, Sherborn, both of Mass.

[73] Assignee: Raytheon Company, Lexington, Mass.

[21] Appl. No.: 714,402

[22] Filed: Sep. 6, 1985

Related U.S. Application Data

[62] Division of Ser. No. 265,712, May 20, 1981, Pat. No. 4,519,708.

[51] Int. Cl.[4] .................. G01C 19/64; H01S 3/05
[52] U.S. Cl. ...................... 356/350; 350/600; 372/19; 372/94; 372/99
[58] Field of Search ............ 372/19, 99, 94, 103; 356/350; 350/163, 164, 440, 448, 600, 642

[56] References Cited

U.S. PATENT DOCUMENTS 3,136,959  6/1964  Culver ........................ 372/19
3,573,656  4/1971  Marcatili .................... 372/19
4,494,373  1/1985  Perlmutter et al. ......... 356/350

FOREIGN PATENT DOCUMENTS

587493    4/1947   United Kingdom ......... 350/440
1217387  12/1970   United Kingdom ......... 350/448

Primary Examiner—James W. Davie
Attorney, Agent, or Firm—Walter F. Dawson; Richard M. Sharkansky

[57] ABSTRACT

In an optical system such as a ring laser gyroscope cavity, oscillations occur in many transverse modes. The desired modes are allowed to exist by suppressing undesired modes utilizing a light stop apparatus. One light stop is made by treating a dielectric mirror with an electron beam causing a phase change to occur to the undesired reflected waves. An alternative light stop is made by depositing an absorptive material on a dielectric mirror for absorbing some of the energy of the undesired modes. Both light stop embodiments are adjustable with respect to a laser wave in a resonant cavity.

27 Claims, 10 Drawing Figures

MODE DISCRIMINATION APPARATUS

This application is a division of Ser. No. 265,712, filed May 20, 1981, U.S. Pat. No. 4,519,708.

BACKGROUND OF THE INVENTION

This invention relates to optical systems and more particularly, the invention relates to the suppression of higher-order transverse modes in a multi-mode resonant cavity of a ring laser gyroscope.

One of the most significant ring laser gyroscopes yet proposed and constructed employs four waves of two pairs each propagating in opposite directions. Such systems are shown and described in U.S. Pat. Nos. 3,741,657, 3,854,819 and 4,006,989 to Keimpe Andringa and assigned to the present assignee. In such laser systems, circular polarization for each of the four waves is used. The pair of waves, or beams, propagating in the clockwise direction includes both left-hand circularly polarized (LCP) waves and right-hand circularly polarized (RCP) waves as do those waves propagating in the counter-clockwise direction. The four-frequency or multi-oscillator ring laser gyro provides a means of circumventing the frequency locking or lock-in problem present in all conventional or two-frequency laser gyroscopes. This lock-in phenomenon occurs when two traveling waves propagating in opposite directions in a resonant cavity at slightly different frequencies are pulled toward each other to combine in a single frequency standing wave. However, when the frequencies of the counter-rotating waves are sufficiently separated in frequency, the pulling together does not occur. The four-frequency approach may be described as two independent laser gyros operating in a single stable resonator cavity, sharing a common optical path, but statically biased in opposite senses by the same passive bias element. In the differential output of these two gyros, the bias then cancels, while any rotation-generated signals add, thereby avoiding the usual problems due to drifts in the bias and giving a sensitivity twice that of a single two-frequency gyro. Because the bias need not be dithered, the gyro never passes through lock-in. Hence, there are no dither-induced errors to limit instrument performance. For this reason, the four frequency gyro is intrinsically a low noise instrument, and it is well suited for applications requiring rapid position update or high resolution.

The four different frequencies are normally generated by using two different optical effects. First, a crystal polarization rotator may be used to provide a direction-independent polarization causing the resonant waves to be circularly polarized in two directions. The polarization rotation results from the refractive index of the rotation medium being slightly different for RCP and LCP waves. Alternatively, a non-planar ring path may be used which inherently supports only circularly polarized waves without the use of a crystal rotator. A non-planar electromagnetic wave ring resonator is shown and described in U.S. Pat. No. 4,110,045 to Irl W. Smith, Jr. and Terry A. Dorschner and assigned to the present assignee. Second, a Faraday rotator is used to provide non-reciprocal polarization rotation, by having a slightly different refractive index for clockwise (cw) traveling waves than for counter-clockwise (ccw) traveling waves. This causes the cw and ccw RCP waves to oscillate at slightly different frequencies while the cw and ccw LCP waves are similarly but oppositely split. Thus, a laser gyro operates with right circular polarized waves biased in one direction of rotation and with left circular polarized waves biased in the opposite direction, the bias being cancelled by subtracting the two outputs.

In the resonant cavity of a ring laser gyroscope, there are a number of resonant modes many of which are unwanted and must be suppressed. In the prior art, the suppression of unwanted modes has been accomplished by machining a narrow spatial aperature into the gyro block cavity, preferably opposite a spherical mirror in a three mirror cavity. Another approach has been to insert a copper disk with a center hole into a resonant cavity as part of a Faraday rotator assembly. Still another approach, in the prior art has been to rely on the resonant cavity wall imperfections inherently present from the machining process of a laser gyro block. A major drawback of the prior art mode discrimination or suppression approaches has been that the aperture was not adjustable, thereby preventing fine tuning once the gyro block was machined and assembled; in addition, a scattering of the intercepted light waves occurred causing an increase in lock-band occurrences at high angular rotation rates and a variation in the gyro bias. These variations degrade the performance of a ring laser gyro.

SUMMARY OF THE INVENTION

This invention discloses an optical system comprising means for providing a plurality of electromagnetic waves and dielectric material means within an optical path of said optical system for altering the phase and amplitude characteristics of said electromagnetic waves. The dielectric material means comprises a dielectric material having one or more areas of said material treated with an electron beam for producing the phase and amplitude alterations to said waves. The dielectric material comprises a plurality of layers, each of which may have a different index of refraction; the layers comprise alternate layers of silicon dioxide and titanium dioxide deposited on a fused silica substrate. The dielectric material means may also comprise a dielectric mirror with an absorption material deposited on part of said mirror for suppressing unwanted resonant modes. The thickness of said absorptive material increases as a function of the distance away from the center of said mirror to produce an increase in energy loss to said undesired resonant modes.

This invention further discloses a mode discrimination means for suppressing undesired resonant modes within a closed path, means for producing a plurality of counter-traveling electromagnetic waves within the closed path, means for producing a direction-dependent phase shift to said waves resulting in a frequency splitting between said counter-traveling and means for adjusting said suppressing means during the propagation of said waves.

The invention further discloses a multi-frequency ring laser gyroscope having a closed path with a gain medium for the propagation of a plurality of electromagnetic waves in opposite directions, each of said waves being of a different frequency, means for producing circularly polarized counter-traveling waves in said closed path arranged in pairs of first and second polarization sense, means for producing a direction-dependent phase shift to said waves resulting in a frequency splitting between counter-traveling waves in each of said pairs, and means for suppressing undesired resonant modes within said closed path. The circularly polarized counter-traveling wave means comprise a non-planar closed path. The laser gain medium comprises a mixture of helium and neon electrically excited by electrodes comprising one or more anodes and cathodes. A Faraday rotator produces the direction-dependent phase shifts to the electromagnetic waves and the closed path comprises means for absorbing electromagnetic waves reflected from the Faraday rotator.

This invention also discloses a laser gyroscope having a closed path with a gain medium for the propagation of a plurality of electromagnetic waves in opposite directions, each of said waves being of a different frequency, means for producing circularly polarized counter-traveling waves in said closed path arranged in pairs of first and second polarization sense, means for producing a direction-dependent phase shift to said waves resulting in a frequency splitting between counter-traveling waves in each of said pairs, reflective means for directing said electromagnetic waves around said closed path, and at least one of said reflective means comprising adjustable, mode discriminating means for suppressing undesired resonant modes within said closed path.

In one embodiment of mode discrimination in a ring laser gyroscope, the mode suppressing means comprises a phase sensitive light stop. This light stop further comprises a dielectric mirror partially treated with an electron beam for producing a phase and amplitude change to a part of the electromagnetic waves reflected from said treated part of said dielectric mirror. The dielectric mirror comprises a plurality of alternate layers of a high and low index of refraction dielectric material including silicon dioxide and titanium dioxide deposited on a fused silica substrate.

In another embodiment of mode discrimination in a ring laser gyroscope, the mode suppressing means comprises an absorptive light stop. This light stop comprises a dielectric mirror with an absorptive material deposited on part of the mirror. The mirror is made from alternate layers of silicon dioxide and titanium dioxide deposited on a fused silica substrate. The thickness of the absorptive material deposited on the surface of the mirror increases as a function of distance away from the center of the mirror producing a differential loss to the undesired resonant modes. Light absorbing glass is one type of absorptive material suitable for a light stop.

The invention further discloses the method of suppressing undesired resonant modes within a laser gyroscope system comprising the steps of propagating a plurality of counter-traveling electromagnetic waves within a closed path each of said waves being of a different frequency, amplifying said waves in a gain medium which is common to at least a portion of said path of each of said waves, providing reciprocal polarization dispersive means and non-reciprocal polarization dispersive means for said waves in said closed path, and providing discriminating means on at least one of a plurality of reflectors within said closed path for suppressing undesired resonant modes. The step of providing mode discriminating means for suppressing the undesired resonant modes comprises either a phase sensitive light stop or an absorptive light stop.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
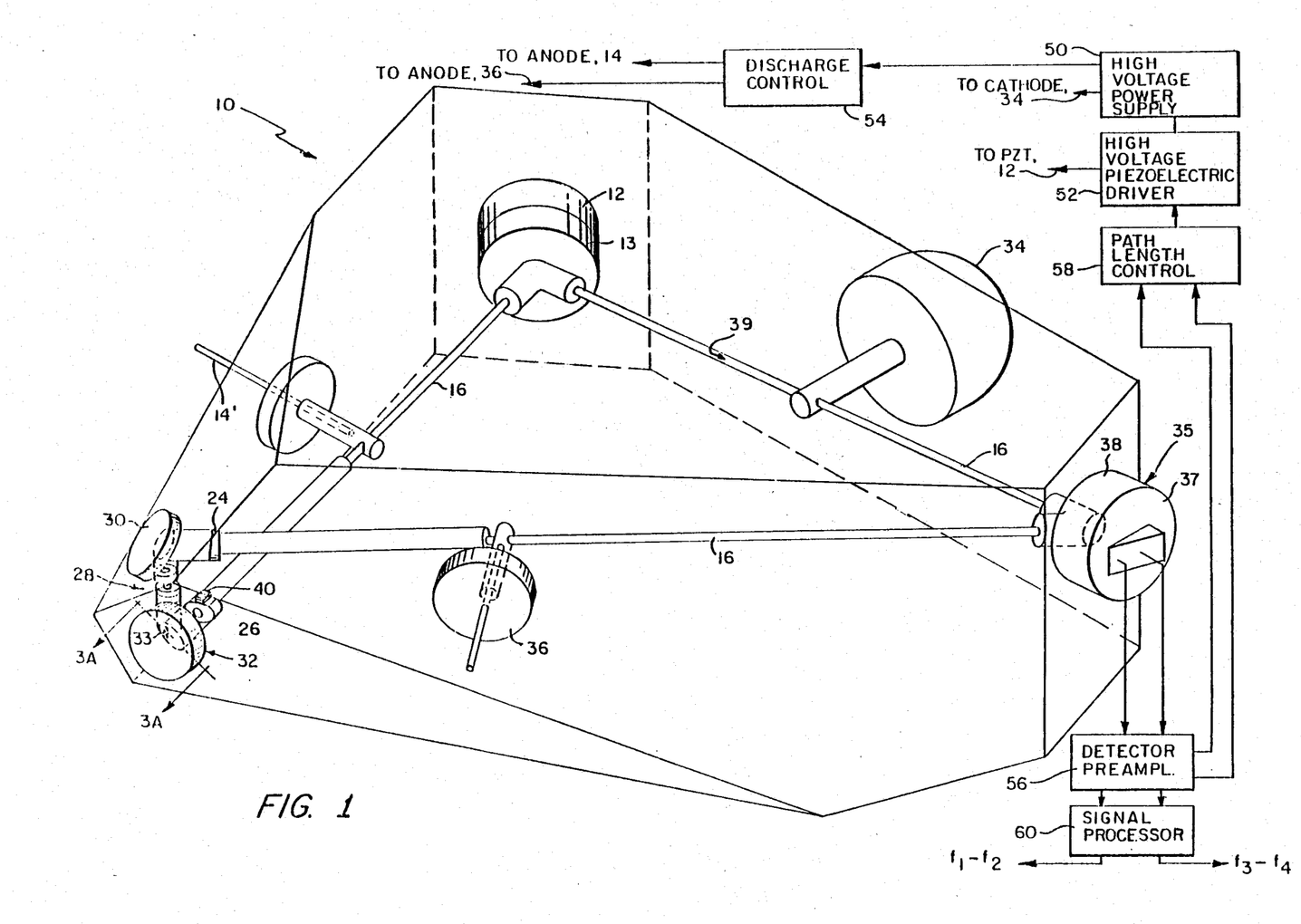
FIG. 1 is a block diagram of a ring laser gyroscope system incorporating a perspective view of the gyro block embodying the invention.

Referring to FIG. 1, a ring laser gyro block 10 is shown. Contained within the gyro block 10 are a non-planar resonator cavity 16 which provides a closed path for the propagation of electromagnetic waves, four dielectric mirrors or reflectors 13, 30, 32 and 38 for directing the waves around the closed path, a Faraday rotator assembly 28 which provides for non-reciprocal polarization rotation of the propagating waves, anodes 14 and 36, cathode 34 and a laser gain medium 39 within optical cavity 16 having a helium-neon gas mixture where the two active isotopes are neon 20 and neon 22. The gaseous gain medium 39 is electrically excited by discharge currents generated between the anodes 14 and 36 and cathode 34, and it becomes a light emitting laser gain medium or plasma sustaining the resonant laser waves in the optical cavity 16. The gyro block 10 is preferably constructed with a material having a low thermal coefficient of expansion such as a glass-ceramic material to minimize the effects of temperature change upon a laser gyroscope system. A preferred commercially available material is sold under the name of Cer-Vit TM material C-101 by Owens-Illinois Company; alternatively, Zerodur TM by Schott Optical Company may be used.

Figure 2:
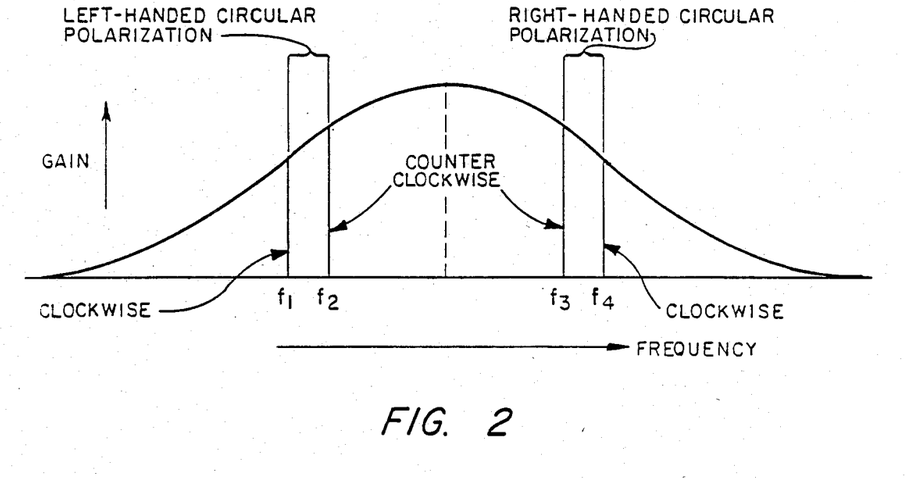
FIG. 2 is a graph showing the gain versus frequency characteristics of the ring laser gyroscope system of FIG. 1 indicating the relative positions of the frequencies of the four waves within the system.

The non-planar ring inherently supports only circularly polarized waves without the use of a crystal rotator. The placement of reflectors 13, 30, 32 and 38 in the ring path 16 produces a phase alteration which alters the resonant frequencies of the waves. The result, as shown in FIG. 2, is that the waves of left-hand circular polarization ($f_1$ and $f_2$) will have a resonant frequency different from the resonant frequency of the right-hand circular polarized waves ($f_3$ and $f_4$). This non-planar electromagnetic wave ring resonator is shown and described in U.S. Pat. No. 4,110,045 to Irl W. Smith, Jr. and Terry A. Dorschner and assigned to the present assignee and the specification is incorporated herein by reference.

Reflector 13 is attached to a piezoelectric element 12 which moves the reflector in and out as part of a cavity path length control system. Reflector 30 is used solely for reflecting the electromagnetic waves in the closed laser path. Reflector 32 in addition to reflecting the desired electromagnetic waves within the closed laser path 16 comprises the invention described herein of a light stop apparatus 33 for suppressing undesired resonant modes within said closed path. Reflector 38 is only partially reflective thereby allowing a small portion of the waves incident on its surface to pass through the reflector and be combined and processed to provide rotational information.

The Faraday rotator assembly 28 is shown in one of the segments of the non-planar ring laser path 16 between reflectors 30 and 32. This non-reciprocal magneto-optical device produces a phase delay bias for waves of either circular polarization sense traveling clockwise which is different from that for waves of similar polarization traveling counterclockwise. The combination of reflectors 13, 30, 32 and 38 and the Faraday rotator 28 is such that the ring resonator supports waves having frequencies of oscillation as shown in FIG. 2. However, there are other alternative means for accomplishing the same results as the Faraday rotator. One such means utilizing the Zeeman effect is described in U.S. Pat. No. 4,229,106 to Terry Dorschner et al and assigned to the present assignee.

Photon absorbers 24 and 26 are positioned for absorbing reflected electromagnetic waves from the Faraday rotator assembly 28. They are fully described in U.S. patent application Ser. No. 235,320 filed in the U.S. Patent Office on Feb. 17, 1981 by Michael Perlmutter and Lawrence L. Clampitt and assigned to the present assignee, U.S. Pat. No. 4,494,873.

In addition to the laser gyroscope block 10, FIG. 1 shows connections to associated laser gyroscope electronics and optics. The high voltage power supply 50 provides a high negative voltage to the cathode 34 and a high positive voltage to the piezoelectric driver 52. Discharge control electronics 54 provides regulation of the current flowing from the anodes to the cathodes; different gyro blocks may require different values of cathode current depending on the optical losses within the particular gyro block.

The path length control system is a feedback network which maintains a consistent and optimum optical path length within the gyro cavity 16. It comprises the detector preamplifier 56 path length control 58 and high voltage piezoelectric driver 52 electronics. The optical path length is controlled by means of a reflector 13 which is mounted on a piezoelectric transducer (PZT) 12. The high voltage driver 52 operates the PZT 12 with an applied voltage ranging from 0 volts to 400 volts. Since stable operating points or modes occur at path length intervals equal to one-half the laser wavelength, the mode which is closest to the center of the transducer's dynamic range will normally be chosen as a permanent operating point. The detector preamplifier 56 separates the AC signals and DC signals received from the output optics 35. The DC signals are used for the path length control. The AC signals are sine waves representing the gyro output, and they are sent to the signal processor 60 where they are converted into two digital pulse streams ($f_1-f_2$ and $f_3-f_4$) with one pulse produced for each cycle within the incoming voltage waveforms. The pathlength control is fully described in U.S. Pat. No. 4,108,553 to Albert N. Zampiello and Bradley J. Patch, Jr. and assigned to the present assignee. The specification of this patent being incorporated herein by reference.

The output optics 35 extracts a portion of each beam circulating within the laser cavity to produce the two output signals, $f_1-f_2$ and $f_3-f_4$, each one of which represents the difference in frequency between wave pairs having the same sense of circular polarization within the cavity as shown in FIG. 2. The output reflector 38 has a transmission coating on one side and a beamsplitter coating on the other side. Both coatings are a standard type using alternate layers of $TiO_2$ and $SiO_2$. The beamsplitter coating transmits half the incident intensity and reflects the other half. A retro-reflecting prism 37 is used to heterodyne the two beams. This right angle prism is made of fused quartz and has silvered reflective faces. A dielectric coating is used between the silver and fused quartz to obtain minimal phase error upon reflection. A quarterwave plate (not shown) followed by sheet polarizers are used to separate the four frequencies present in each beam. A wedge (not shown) is used between the retro-reflecting prism and the quarterwave plate to prevent reflections from the interfaces from propagating back into the gyro cavity and mixing with the counter-rotating beams. A photo-diode cover glass (anti-reflection coated on one side) and a photo-diode package (not shown) complete the output optics 35. An optical cement is used between the various interfaces to provide adhesion and to minimize reflections. The output optics is fully described in U.S. Pat. No. 4,141,651 to Irl W. Smith and Terry A. Dorschner and assigned to the present assignee, the specification of this patent being herein incorporated by reference.

Figure 3A:
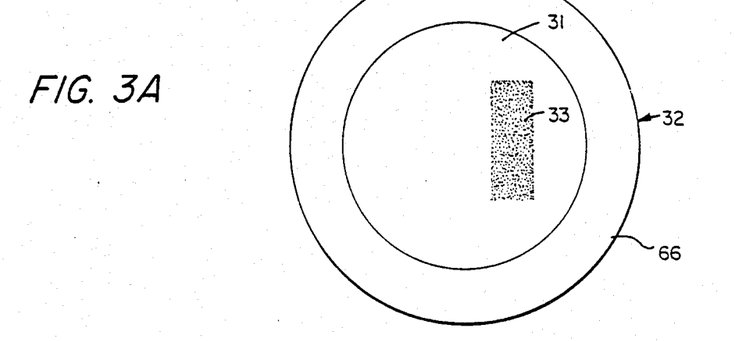
FIG. 3A is a front surface view of a reflector embodying the invention of a phase sensitive light stop as viewed from inside the closed path as shown in FIG. 1.
Figure 3B:
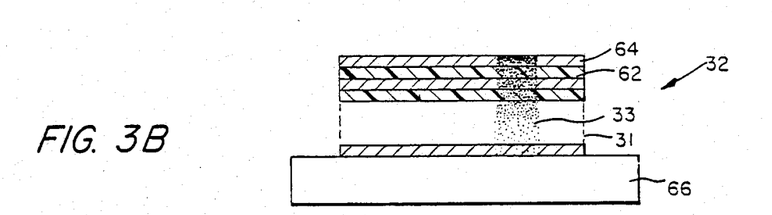
FIG. 3B is an exaggerated side elevation cross-sectional view of a reflector embodying the invention of a phase sensitive light stop.

Referring now to FIG. 3A, reflector 32 is shown which functions as a phase sensitive light stop apparatus comprising a dielectric mirror 31 with a specific area of the mirror 31 irradiated by an electron beam from a scanning electron microscope or other similar instrument. This electron beam treated area 33 creates a phase shift and a small amplitude reduction to some fraction of a traveling electromagnetic wave as a result of a change in the index of refraction in the electron beam treated area 33. The dielectric mirror 31 as shown in FIG. 3B is made from alternate layers of silicon dioxide ($SiO_2$) 62 and titanium dioxide ($TiO_2$) 64 on a fused silica $SiO_2$ substrate 66. The treated area 33 extends through most of the alternate layers of $SiO_2$ and $TiO_2$. This phase sensitive light stop provides resonant mode discrimination without adding any measurable wave scattering to the counter-rotating electromagnetic waves. It provides a small amount of electromagnetic wave amplitude reduction but the effect is not sufficient by itself to suppress unwanted modes. However, because it also changes the phase of a small fraction of the unwanted counter-rotating waves (high order modes) within the closed path 16, they acquire sufficient loss to prevent them from lasing.

The irradiation of a reflector or dielectric mirror 31 in order to produce a treated area of approximately 4 millimeters long and 0.5 millimeters wide that will cause a phase shift of an electromagnetic wave is accomplished by using an electron beam instrument such as a scanning electron microscope (SEM) manufactured by Cambridge Scientific Instrument Ltd. of Cambridge, England, Model S-4 Stereoscan with Video Presentation Unit (VPU). The SEM controls are adjusted as follows during the electron beam treating procedure:
Accelerating voltage ($E_B$) = 30K Volts
Specimen Current ($I_S$) = $2 \times 10^{-8}$ Amperes
Final Apperature diameter = 700 micrometers
Magnification = 20X
Mode = Single Line Repetitive Scan
Tilt = Zero The procedure for treating a dielectric mirror with the SEM is as follows:

1. Coat a dielectric mirror with 500 angstroms of copper for connection to ground.
2. Adjust the SEM for normal specimen viewing at a zero tilt angle and record the working distance reading.
3. Set the video presentation unit (VPU) of the SEM for a rotation angle of zero at the working distance determined during Step 2.
4. Position the desired region of the dielectric mirror to be treated under the electron beam.
5. Defocus the electron beam to a working distance of 40 millimeters.
6. Set the VPU for a rotation angle of zero at a working distance of 40 millimeters.
7. Set Mode to Line Scan.
8. Expose the dielectric mirror to the electron beam for four (4) hours.
9. Strip the copper from the dielectric mirror in a suitable etchant such as ammonium persulphate.

Referring now to FIGS. 5A–5D, Hermite-Gaussian Functions are shown representing the one dimensional intensity distribution of the fundamental and higher order off-axis resonant modes. The existence of these modes in a resonator type structure such as a confocal Fabrey-Perot type resonator or a ring laser resonator with spherical and flat reflectors of equal size and reflectivity has been demonstrated and described in detail in the articles "Resonant Modes in a Maser Interferometer " by A. G. Fox and Tingye Li and "Confocal Multimode Resonator for Millimeter Through Optical Wavelength Masers " by G. D. Boyd and J. P. Gordon in the Bell System Technical Journal, March 1961, Volume 40, pp. 453–488 and pp. 489–508, respectively. A mode may be defined as a field distribution that reproduces itself in spatial distribution and phase, though not in amplitude, as the wave bounces back and forth between the two reflectors. Because of losses due to diffraction and reflection, the reproduced pattern is reduced in intensity on each succeeding traversal of the resonator if no gain medium is present. In the aforementioned articles, the authors have shown that there is a set of modes which will reproduce themselves over the equal size mirrors of the resonator. When the effect of diffraction losses due to finite apertures is included, the modes become unique and each mode has its own characteristic rate of decay or Q. When gain supplied by a helium-neon discharge is included, a steady state condition is reached where all the modes that have more gain than loss will oscillate or lase. Said losses of a mode comprises diffraction loss and losses due to imperfect mirrors.

For the case of low diffraction losses, the eigenfunctions of the modes are still given with good approximation by the following Hermite-Gaussian functions, as shown in FIGS. 5A–5D, which are exact only for the loss-less case of infinite apertures:

$$U_L = (\pi^{\frac{1}{2}} L! \, 2^L)^{-\frac{1}{2}} H_L(\xi) e^{-\xi^2/2}$$

where, $U_L$ = Hermite-Gaussian Polynomial of Oder L.

The curves in FIGS. 5A–5D show the intensity distribution of the low order transverse electric modes which are normalized to present a fixed amount of total beam power in all the modes.

$$\left( \int_{-\infty}^{\infty} U_L^2(\xi) d\xi = 1 \right).$$

It is important to note that the higher order modes contain more energy in the "tails " (greater distance from the beam center) than do lower order modes. The light stop mode discrimination invention adds sufficient energy loss to the higher order modes to prevent them from lasing, but does not add enough loss to the fundamental to prevent it from lasing.

Figure 4A:
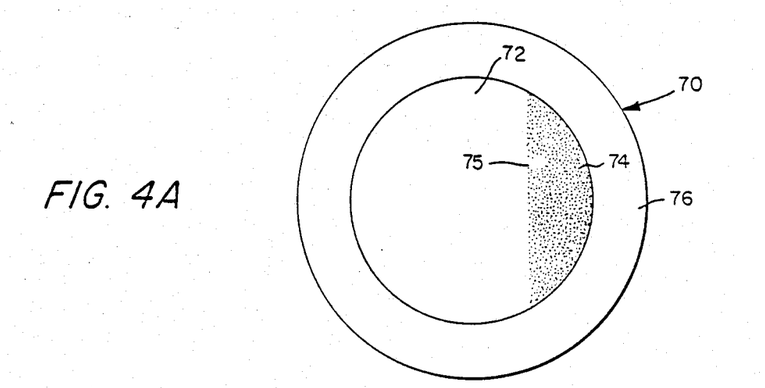
FIG. 4A is a front surface view of a reflector embodying the invention of an absorptive light stop as viewed from inside the closed path as shown in FIG. 1.
Figure 4B:
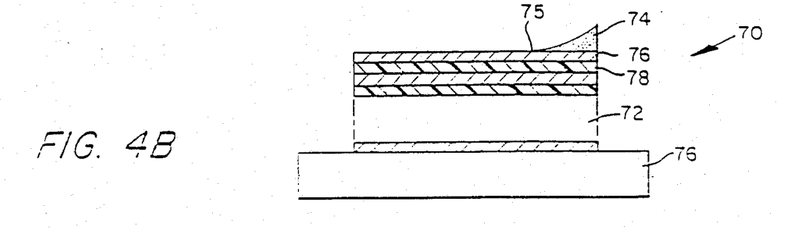
FIG. 4B is an exaggerated side elevation cross-sectional view of a reflector embodying the invention of an absorptive light stop.
Figure 5A:
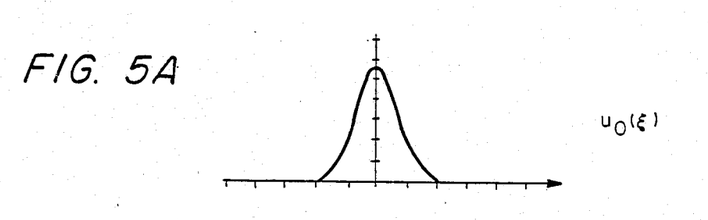
FIG. 5A is a graph showing the fundamental mode of the Hermite Gaussian Function, $U_0(\xi)$, representing a one dimensional intensity distribution of the fundamental mode.
Figure 5B:
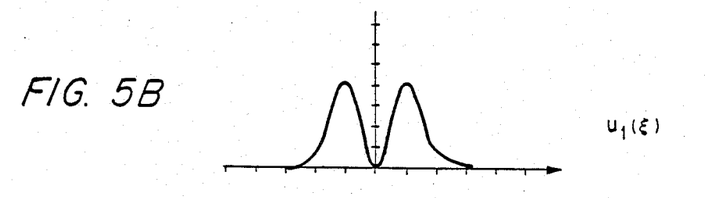
FIG. 5B is a graph of the Hermite Gaussian Function, $U_1(\xi)$, representing a one dimensional intensity distribution of the first off-axis mode.
Figure 5C:
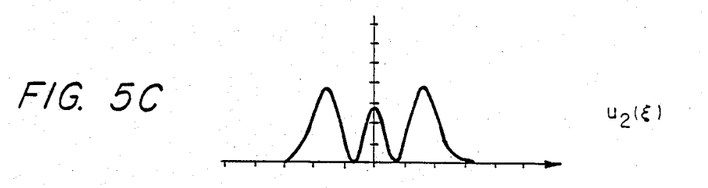
FIG. 5C is a graph of the Hermite Gaussian Function, $U_2(\xi)$, representing a one dimensional intensity distribution of the second off-axis mode.
Figure 5D:
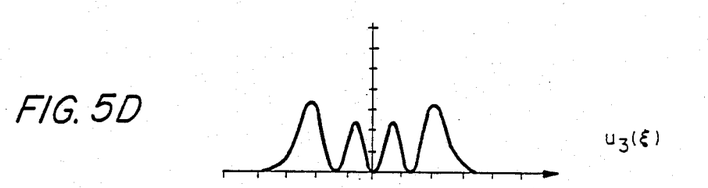
FIG. 5D is a graph of the Hermite Gaussian Function; $U_3(\xi)$, representing a one dimensional intensity distribution of the third off-axis mode.

Referring now to FIGS. 4A and 4B, an alternate absorptive light stop 70 is shown. It is made by depositing an absorptive material 74 on a dielectric mirror 72. The absorptive material, such as sputtered light absorbing glass, is deposited on top of approximately 20 alternate layers of $SiO_2$ and $TiO_2$ which have been deposited on a fused silica $SiO_2$ substrate 76. The absorptive material 74 thickness varies linearly or quadratically as a function of distance from the center of the mirror 72 in order to minimize scattering effects and achieve higher order mode suppression by energy absorption. However, with this type of light stop, there will always be some type of discrete interface 75 present between the start of the absorptive material (closest to the center of the mirror 72) and the surface of the mirror 72, which produces the undesirable scattering of some amount of incident light energy.

The light stop invention provides a significant improvement over the prior art methods of resonant mode suppression by the ability to adjust the light stop after fabrication and assembly of a gyro block 10 and during the propagation of electromagnetic waves within the closed path 16 as shown in FIG. 1. This adjustment is accomplished by changing the position of a reflector 32 with respect to the traveling waves. If the surface of a reflector is flat, the adjustment procedure is simply one of sliding the reflector on the mounting surface while monitoring the losses of the fundamental and higher-order modes at the output of the signal processor 60. If a reflector is spherical (not shown) and comprises an absorptive light stop 70, then the absorptive material must be deposited in a radial direction and mode adjustment would be accomplished by rotating the reflector along its spherical axis. In addition to the adjustability improvement, this light stop invention eliminates the need for an intracavity element to perform undesirable mode suppression.

This concludes the description of the embodiments of the invention described herein. However, many modifications and alterations will be obvious to one skilled in the art without departing from the spirit and scope of the inventive concept. Therefore, it is intended that the scope of this invention be limited only by the appended claims.

What is claimed is:
1. In combination:
an optical system comprising means for producing a plurality of electromagnetic waves;

dielectric material means within an optical path of said optical system for altering the phase and amplitude characteristics of said electromagnetic waves; and said dielectric material means comprising a dielectric material having one or more areas of said material treated with an electron beam for producing said phase and amplitude alterations to said waves.

2. The combination as recited in claim 1 wherein:
said dielectric material comprises a plurality of layers each of which may have a different index of refraction.

3. The combination as recited in claim 2 wherein:
said layers comprise alternate layers of silicon dioxide and titaniun dioxide deposited on a fused silica substrate.

4. In combination:
means for producing a plurality of counter-traveling electromagnetic waves within a closed path with a gain medium;

means for producing a direction-dependent phase shift to said waves resulting in a frequency splitting between said counter-traveling waves; and means for suppressing undesired resonant modes within said closed path, said suppressing means comprising a phase sensitive light stop having a dielectric mirror partially treated with an electron beam.

5. The combination as recited in claim 4 wherein:
said gain medium comprises a mixture of helium and neon electrically excited by electrodes; and
said electrodes further comprises one or more anodes and cathodes for producing an excitation current.

6. The combination as recited in claim 4 wherein:
said closed path further comprises a plurality of reflectors for directing said electromagnetic waves around 7. The combination as recited in claim 4 wherein:
said direction-dependent frequency splitting means comprises magneto-optical means.

8. The combination as recited in claim 4 wherein:
said suppressing means further comprises means for adjusting said suppressing means during the propagation of said waves.

9. The combination as recited in claim 8 wherein:
said undesired resonant modes within said closed path comprises off-axis higher order resonant modes.

10. In combination:
a laser gyroscrope having a closed path with a gain medium for the propagation of a plurality of electromagnetic waves in opposite directions, each of said waves being of a different frequency;

means for producing circularly polarized counter-traveling waves in said closed path arranged in pairs of first and second polarization sense;

means for producing a direction-dependent phase shift to said waves resulting in a frequency splitting between counter-traveling waves in each of said pairs; and means for suppressing undesired resonant modes within said closed path, said suppressing means comprising a phase sensitive light stop having a dielectric mirror partially treated with an electron beam.

11. The combination as recited in claim 10 wherein:
said laser gain medium comprises a mixture of helium and neon electrically excited by electrodes; and
said electrodes further comprise one or more anodes and cathodes for producing an excitation current.

12. The combination as recited in claim 10 wherein:
said closed path further comprises a plurality of reflectors for directing said electromagnetic waves around said path.

13. The combination as recited in claim 10 wherein:
said circularly polarized counter-traveling wave means comprises a non-planar closed path with right circularly polarized waves and left circularly polarized waves propagating in said path.

14. The combination as recited in claim 10 wherein:
said direction-dependent frequency splitting means comprises magneto-optical means.

15. The combination as recited in claim 10 wherein:
said phase sensitive light stop comprising a dielectric mirror partially treated with an electron beam produces a phase and amplitude change to a part of said electromagentic waves reflected from said treated part of said dielectric mirror.

16. The combination as recited in claim 15 wherein:
said dielectric mirror comprises a plurality of alternate layers of a high and low index of refraction dielectric material including silicon dioxide and titanium dioxide deposited on a fused silica substrate.

17. The combination as recited in claim 10 wherein:
said undesired resonant modes within said closed path comprises off-axis higher order resonant modes.

18. In combination:
a laser gyroscope having a closed path with a gain medium for the propagation of a plurality of electromagnetic waves in opposite directions, each of said waves being of a different frequency;

means for producing circularly polarized counter-traveling waves in said closed path arranged in pairs of first and second polarization sense;

means for producing a direction-dependent phase shift to said waves resulting in a frequecy splitting between counter-traveling waves in each of said pairs;

reflective means for directing said electromagnetic waves around said closed path; and at least one of said reflective means comprising adjustable, mode discriminating means for suppressing undesired resonant modes within said closed path, said suppressing means comprising a phase sensitive light stop having a dielectric mirror partially treated with an electron beam.

19. The combination as recited in claim 18 wherein:
said laser gain medium comprises a mixture of helium and neon electrically excited by electrodes; and
said electrodes further comprise one or more anodes and cathodes for producing an excitation current.

20. The combination as recited in claim 18 wherein:
said reflective means comprises a plurality of dielectric mirrors.

21. The combination as recited in claim 18 wherein:
said circularly polarized counter-traveling wave means comprises a non-planar closed path with right circularly polarized waves and left circularly polarized waves propagating in said path.

22. The combination as recited in claim 18 wherein:
said direction-dependent frequency splitting means comprises a Faraday rotator.

23. The combination as recited in claim 17 wherein:
said dielectric mirror comprises a plurality of alternate layers of a high and low index of refraction dielectric materials including silicon dioxide and titanium dioxide deposited on a fused silica substrate.

24. The method of suppressing undesired resonant modes within a laser gyroscope system comprising the steps of:
propagating a plurality of counter-traveling electromagnetic waves within a closed path each of said waves being of a different frequency;
amplifying said waves in a gain medium which is common to at least a portion of said path of each of said waves; and
partially treating a portion of at least one of a plurality of reflectors within said closed path with an electron beam for suppressing undesired resonant modes.

25. The method as recited in claim 24 wherein:
said step of treating a portion of at least one of a plurality of reflectors within said closed path with an electron beam produces a phase and amplitude change to a part of said electromagnetic waves reflected from said treated part of said one of said plurality of reflectors.

26. The method as recited in claim 25 wherein:
said reflectors comprise a plurality of alternate layers of high and low index of refraction dielectric materials including silicon dioxide and titanium dioxide deposited on a fused silica substrate.

27. In combination:
an electromagnetic wave ring resonator for supporting an electromagnetic wave having a fundamental resonant mode disposed along an axis of said resonator and higher order resonant modes displaced from said axis;
means disposed in said resonator having one or more areas treated with an electron beam for producing phase and amplitude alterations to said higher order resonant modes.

* * * * *